United States Patent
Berger et al.

(10) Patent No.: US 9,477,613 B2
(45) Date of Patent: Oct. 25, 2016

(54) POSITION-BASED REPLACEMENT POLICY FOR ADDRESS SYNONYM MANAGEMENT IN SHARED CACHES

(71) Applicant: International Business Machines Corporation, Armonk, NY (US)

(72) Inventors: Deanna Postles Dunn Berger, Poughkeepsie, NY (US); Michael F. Fee, Cold Spring, NY (US); Arthur J. O'Neil, Jr., Poughkeepsie, NY (US); Robert J. Sonnelitter, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 14/621,454

(22) Filed: Feb. 13, 2015

(65) Prior Publication Data
US 2016/0239434 A1   Aug. 18, 2016

(51) Int. Cl.
*G06F 12/12* (2016.01)
*G06F 12/08* (2016.01)

(52) U.S. Cl.
CPC .......... *G06F 12/123* (2013.01); *G06F 12/084* (2013.01); *G06F 2212/62* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 5,668,968 A | 9/1997 | Wu | |
| 6,067,608 A | 5/2000 | Perry | |
| 6,138,215 A | 10/2000 | Check et al. | |
| 6,138,226 A | 10/2000 | Yoshioka et al. | |
| 7,389,389 B2 | 6/2008 | Gharachorloo et al. | |
| 2009/0216949 A1* | 8/2009 | Krumm ............... | G06F 12/0811 711/122 |
| 2014/0129774 A1 | 5/2014 | Habermann et al. | |

FOREIGN PATENT DOCUMENTS

GB    2516477 A  *  1/2015  .......... G06F 12/0811

OTHER PUBLICATIONS

Kim et al., "U-Cache: A Cost-Effective Solution to the Synonym Problem", Feb. 1995, IEEE, 10 pages.*
Disclosed anonymously (Jan. 2013). Mechanism to efficiently refine alias information to aid removal of redundant expressions. 7 pgs.
(Continued)

*Primary Examiner* — Gary Portka
(74) *Attorney, Agent, or Firm* — Cantor Colburn LLP; Margaret A. McNamara

(57) ABSTRACT

A computer-implemented method includes receiving a request to access a cache entry in a shared cache. The request references a synonym for the cache entry. A cache directory of the shared cache includes, for each cache entry of the shared cache, a first-ranked synonym slot for storing a most recently used synonym for the cache entry and a second-ranked synonym slot for storing a second most recently used synonym for the cache entry. The method includes, based on receiving the request, writing contents of the first-ranked synonym slot for the cache entry to the second-ranked synonym slot for the cache entry, and writing the synonym referenced in the request to the first-ranked synonym slot for the cache entry.

18 Claims, 3 Drawing Sheets

(56) References Cited

OTHER PUBLICATIONS

Garrett M. Drapala et al., pending U.S. Appl. No. 14/621,460, entitled "Early Shared Resource Release in Symmetric Multiprocessing Computer Systems," filed with the U.S. Patent and Trademark Office on Feb. 13, 2015.

Garrett M. Drapala et al., pending U.S. Appl. No. 14/621,467, entitled "Dynamic Synchronous to Asynchronous Frequency Transitions in High-Performance Symmetric Multiprocessing," filed with the U.S. Patent and Trademark Office on Feb. 13, 2015.

List of IBM Patents or Patent Applications Treated as Related, 2 pgs.

Qureshi et al. (Dec. 2006). Utility-based cache partitioning: A low-overhead, high-performance, runtime mechanism to partition shared caches. In Proceedings of the 39th Annual IEEE/ACM International Symposium on Microarchitecture (pp. 423-432).

* cited by examiner

POSITION-BASED REPLACEMENT POLICY FOR ADDRESS SYNONYM MANAGEMENT IN SHARED CACHES

BACKGROUND

Various embodiments of this disclosure relate to shared caches and, more particularly, to a position-based replacement policy for address synonym management in shared caches.

In a processor, each core may be associated with its own virtual memory, and virtual addresses in the virtual memory translate to physical addresses in the physical memory. Each core thus has access to its own translation lookaside buffer (TLB), which is specialized hardware private to its associated core. The TLB may handle translations back and forth between virtual and physical addresses for its associated core. Because there are multiple virtual address spaces, each physical address may map to multiple virtual addresses. Each set of virtual addresses that correspond to a common physical address is known as a set of synonyms. Various mechanisms exist for managing synonyms in a computer system.

SUMMARY

In one embodiment of this disclosure, a computer-implemented method includes receiving a request to access a cache entry in a shared cache. The request references a synonym for the cache entry. A cache directory of the shared cache includes, for each cache entry of the shared cache, a first-ranked synonym slot for storing a most recently used synonym for the cache entry and a second-ranked synonym slot for storing a second most recently used synonym for the cache entry. The method includes, based on receiving the request, writing contents of the first-ranked synonym slot for the cache entry to the second-ranked synonym slot for the cache entry, and writing the synonym referenced in the request to the first-ranked synonym slot for the cache entry.

In another embodiment, a system includes one or more computer processors configured to receive a request to access a cache entry in a shared cache. The request references a synonym for the cache entry. A cache directory for the shared cache includes, for each cache entry of the shared cache, a first-ranked synonym slot for storing a most recently used synonym for the cache entry and a second-ranked synonym slot for storing a second most recently used synonym for the cache entry. Based on receiving the request, the one or more processors are further configured to write contents of the first-ranked synonym slot for the cache entry to the second-ranked synonym slot for the cache entry. Also based on receiving the request, the one or more processors are further configured to write the synonym referenced in the request to the first-ranked synonym slot for the cache entry.

In yet another embodiment, a computer program product for implementing a least recently used replacement policy for synonyms in a cache directory of a shared cache includes a computer readable storage medium having program instructions embodied therewith. The program instructions are executable by a processor to cause the processor to perform a method. The method includes receiving a request to access a cache entry in a shared cache. The request references a synonym for the cache entry. A cache directory of the shared cache includes, for each cache entry of the shared cache, a first-ranked synonym slot for storing a most recently used synonym for the cache entry and a second-ranked synonym slot for storing a second most recently used synonym for the cache entry. The method includes, based on receiving the request, writing contents of the first-ranked synonym slot for the cache entry to the second-ranked synonym slot for the cache entry, and writing the synonym referenced in the request to the first-ranked synonym slot for the cache entry.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Synonym management systems, methods, and computer program products according to this disclosure can be used to manage synonyms (i.e., a set of virtual addresses corresponding to a common physical address) in level three (L3) cache or other shared cache.

A shared cache, such as the L3 cache, is shared across the cores of a processor having two or more cores. In the past, synonym translations between virtual addresses and physical addresses occurred strictly within the processor cores, for example, via the use of processor-specific translation lookaside buffers (TLBs), and the L3 cache handled only physical addresses. However, more recently, level two (L2) cache has become indexed by virtual addresses in some machines to improve access time. With this change, the L3 cache becomes responsible for managing synonyms, so the L3 directory was expanded to include up to two active synonyms. The two most recently used synonyms for each L3 cache entry are stored in a cache directory for the L3 cache, along with a validity bit for each synonym, indicating whether the corresponding stored synonym value is valid. A least recently used (LRU) replacement policy is used to determine which synonym to remove when a third synonym becomes active.

The conventional implementation of this policy requires further expansion of the L3 cache by one bit for each cache entry. The bit, referred to herein as the LRU bit, indicates which of the two synonyms being stored in the L3 cache was used least recently. When a third synonym becomes active, the processor looks at the LRU bit to determine which of the two stored synonyms was least recently used. The synonym deemed to be least recently used is then replaced with the newly active synonym, and the LRU bit is then set to indicate that the other, remaining synonym was least recently used. In this manner, the L3 cache can manage the two most recently used synonyms along with their associated cache entries.

Thus, with conventional synonym management, the L3 cache must maintain its entries, as well as an LRU bit for each cache entry indicating which synonym was least recently used and should therefore be replaced when another synonym becomes active. Thus, for an L3 cache that has 256,000 entries, 256,000 bits are required to maintain LRU bits for every entry. Embodiments of this disclosure may remove the need to maintain these additional bits and, as a result, may significantly reduce the hardware resources needed to manage synonyms.

Figure 1:
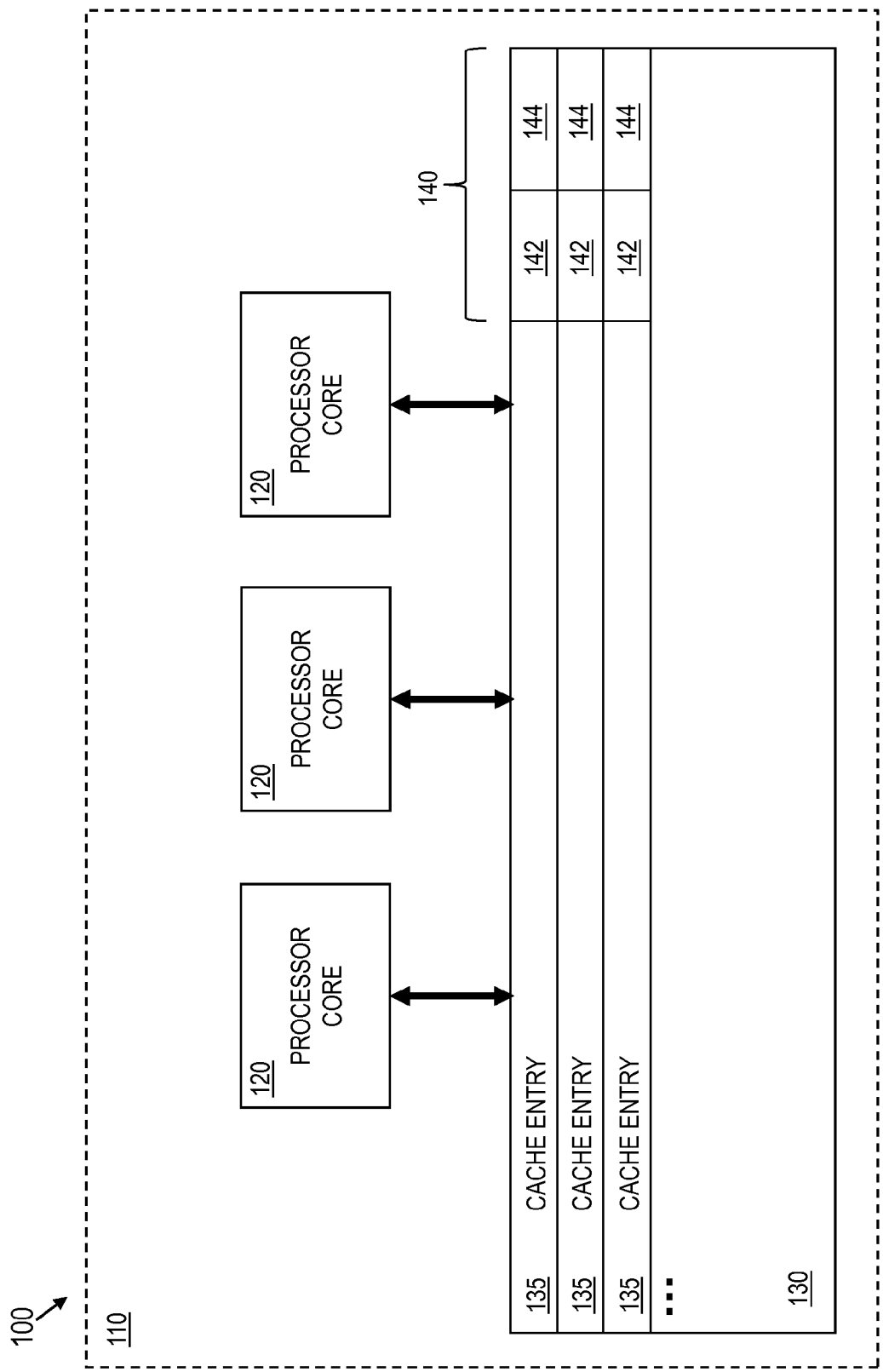
FIG. 1 is a block diagram of a processor using a synonym management system, according to some embodiments of this disclosure.

FIG. 1 is a block diagram of a processor 110 using a synonym management system 100, according to some embodiments of this disclosure. As shown, the processor 110 may include one or more cores 120 and a shared cache 130, such as an L3 cache. A cache directory of the shared cache 130 may include two or more synonym slots 140 for each cache entry 135, where each synonym slot may hold a single synonym for the associated cache entry 135 in the cache directory based on physical addresses. In conventional systems, the cache directory includes exactly two synonym slots 140 per cache entry 135, but it will be understood that embodiments of this disclosure may be operative with shared caches whose directories maintain space for two or more synonyms per cache entry 135. In contrast to conventional mechanisms of synonym management, the cache directory of the shared cache 130 need not maintain space for LRU bits.

According to some embodiments, the synonym slots 140 for each cache entry 135 may be ordered. A first-ranked synonym slot 142 may be filled by the synonym that was used most recently, while a second-ranked synonym slot 144 may be filled by the synonym used second most recently. If more than two synonym slots 140 are maintained, one of skill in the art will understand that each synonym slot 140 may be designated for a synonym based on how recently used that synonym is.

For example, a cache line for a particular physical address P includes two synonym slots, a first-ranked synonym slot 142 and a second-ranked synonym slot 144. The first-ranked synonym slot 142 contains a synonym X, while the second-ranked synonym slot 144 contains a synonym Y. In this case, it is known that synonym X is the most recently used synonym for physical address P (i.e., physical address P was referred to by reference to synonym X more recently than any other synonym), because synonym X is stored in the first-ranked synonym slot 142. It is also known that synonym Y is the second most recently used synonym for physical address P, because synonym Y is in the second-ranked synonym slot 144.

When a request for a physical address is received referencing a synonym, where that synonym not currently stored in one of the synonym slots 140 of the corresponding cache entry 135, that newly active synonym may displace one of the synonyms in the synonym slots 140 for the corresponding cache entry 135. As a result, each of the synonyms in the synonym slots 140 may be demoted, i.e., moved down to a lower-ranked synonym slot 140. More specifically, for example, when a synonym becomes newly active, the synonym in the first-ranked synonym slot 142 (i.e., the most recently used synonym) may be demoted to the second-ranked synonym slot 144, while the synonym in the second-ranked synonym slot 144 (i.e., the second most recently used synonym) may also be demoted. In the case where exactly two synonym slots 140 are being used, demotion of the synonym in the second-ranked synonym slot 144 may remove this synonym from the synonym slots 140 altogether, such that this synonym is no longer stored in the cache directory. More generally, the lowest ranked (i.e., least recently used) synonym stored in the synonym slots 140 may be demoted out of the cache directory when a newly active synonym is added to the synonym slots 140. The newly active synonym may be written to the first-ranked synonym slot 142 (i.e., the synonym slot 140 for the most recently used synonym).

As mentioned above, each synonym slot 140 may have an associated validity bit in the cache directory, indicating whether the corresponding value in the synonym slot 140 is a valid synonym. The first time a cache access request is received for a specific physical address, which is when the address will be first loaded into the shared cache 130, there will be only a single valid synonym. This valid synonym may be written into the first-ranked synonym slot 142 for the cache line, and the validity bit for first-ranked synonym slot 142 may be turned on (e.g., marked as valid, set to a value of 1 or TRUE). Because only a single synonym has been used, the validity bit for the second-ranked synonym slot 144 may remain off. When a second synonym becomes active, the contents of the first-ranked synonym slot 142 may be written to the second-ranked synonym slot 144, and the second-ranked synonym slot's corresponding validity bit may be turned on. The newly active synonym may be written to the first-ranked synonym slot 142.

For each later request related to the same physical address, there may be period of time during which the synonym in the second-ranked synonym slot 144 (or the lowest-ranked synonym slot 140, if more than two synonym slots 140 are being used) becomes invalid. For instance, when a third synonym becomes active, the synonym in the second-ranked synonym slot 144 may now be invalid because only two synonyms are being maintained in the cache directory. Thus, the validity bit corresponding to the second-ranked synonym slot 144 may be turned off (e.g., marked as invalid, set to a value of 0 or FALSE), until the synonym in the first-ranked synonym slot 142 is moved to the second-ranked synonym slot 144. The one or more processor cores 120 associated with the now-invalid synonym may be notified that the synonym is no longer active. Once the move occurs, the validity bit may be turned back on. There may be no need to change the validity bit of the first-ranked synonym slot 142 after it is initially turned on, because the synonym maintained in the first-ranked synonym slot 142 is being moved to the second-ranked synonym slot 144 and remaining in the cache directory as an active synonym.

Returning to the above example, in which synonym X and synonym Y are stored respectively in the first-ranked and second-ranked synonym slots 142 and 144 for physical address P, suppose a synonym Z becomes newly active for physical address P. In this case, synonym P is now the most recently used synonym for physical address P and may thus be stored in the first-ranked synonym slot 142. The validity bit for the second-ranked synonym slot 144 is turned off, responsive to the newly active synonym. The current contents of the first-ranked synonym slot 142, specifically synonym X, are written to the second-ranked synonym slot 144. The validity bit for the second-ranked synonym slot 144 is then be turned back on. Synonym X is thus demoted from the first-ranked synonym slot 142 to the second-ranked synonym slot 144. Synonym Z is written is written to the first-ranked synonym slot 142, because it is the most recently used synonym for physical address P. In this example, only two synonym slots 140 are being used, so synonym Y is demoted from all synonym slots 140. The processor cores 120 associated with synonym Y is notified that synonym Y is no longer referenced in the shared cache 130.

In some cases, a request for a physical address may refer to a synonym already stored in a synonym slot of the cache directory. In some embodiments, if the request refers to the synonym in the first-ranked synonym slot, the values stored in the first-ranked and second-ranked synonym slots 140 may remain unchanged. In the case where the request refers to the synonym in the second-ranked synonym slot 144, the synonyms in the first-ranked and second-ranked synonym slots 142 and 144 may be swapped. In some further embodiments, this swap may be implemented in the same manner as other synonym replacements; for example, the value in the second-ranked synonym slot 144 may be overwritten with the value in first-ranked synonym slot 142, and the synonym referenced in the request may then be written to the first-ranked synonym slot 142.

Thus, the position of a synonym within the synonym slots 140 of the cache directory may determine how recently a synonym was used, and may therefore be used to implement an LRU replacement policy for synonyms. According to some embodiments, no LRU bit need be maintained because the positions of the synonyms within the synonym slots 140 may serve the purpose of ordering the synonyms based on recent use.

Figure 2:
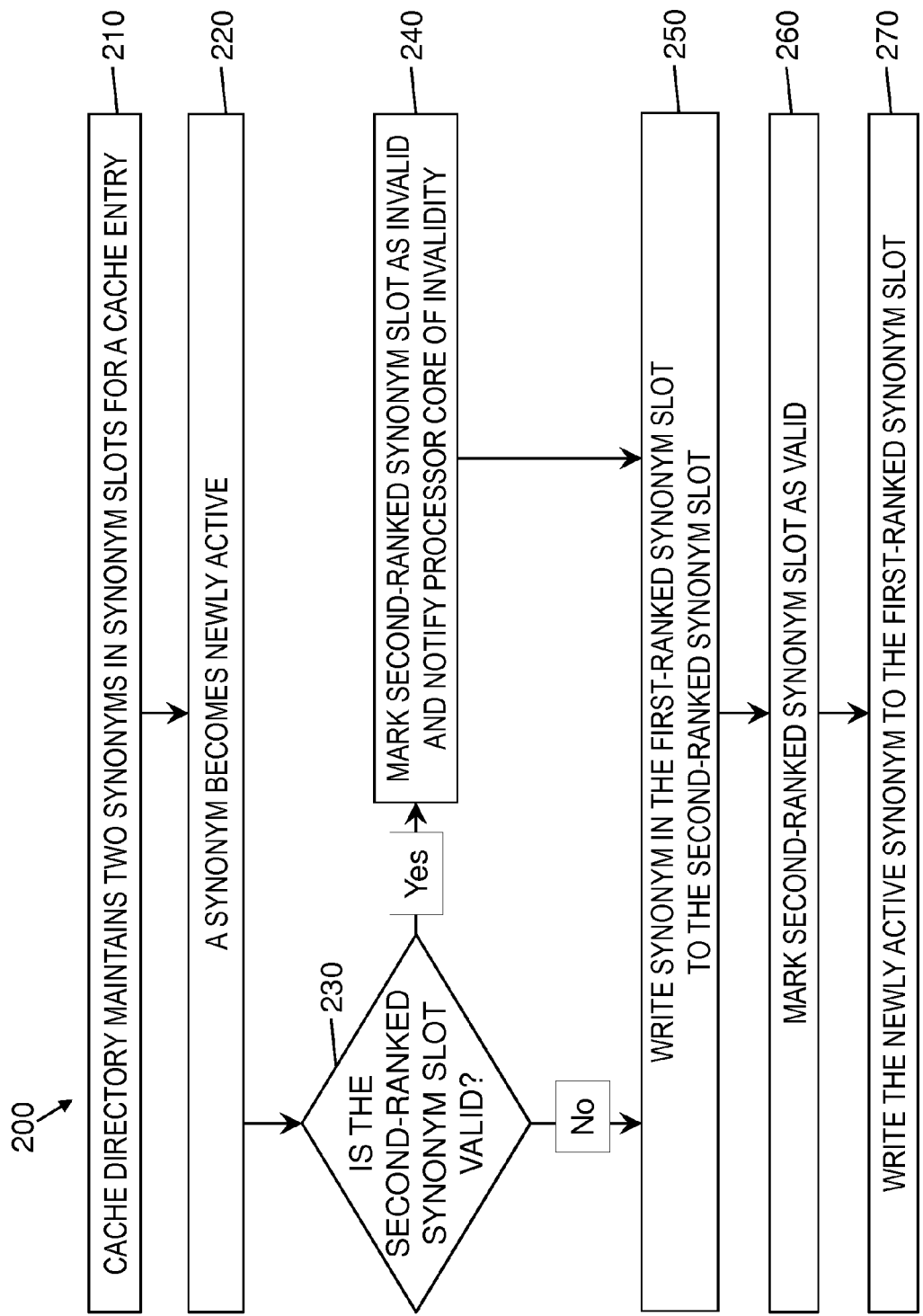
FIG. 2 is a flow diagram of a method for managing synonyms in a shared cache of a processor, according to some embodiments of this disclosure.

FIG. 2 is a flow diagram of a method 200 for managing synonyms in a shared cache 130 of a processor, according to some embodiments of this disclosure. As shown, at block 210, a cache directory of the shared cache 130 may maintain two synonyms in the synonym slots 140, a first-ranked synonym slot 142 and a second-ranked synonym slot 144, of a cache entry 135. The first-ranked synonym slot 142 may hold the most recently used synonym for the cache entry 135, while the second-ranked synonym slot 144 may hold the second most recently used synonym. At block 220, a synonym may become newly active. At decision block 230, the processor 110 may determine whether the second-ranked synonym slot 144 is valid, i.e., whether the corresponding validity bit is turned on. If the second-ranked synonym slot 144 is not valid, then the method 200 may go to block 250. On the other hand, if the second-ranked synonym slot 144 is valid, then at block 240, the second-ranked synonym slot 144 may be marked as invalid, and the associated processor cores 120 may be notified. The method may then go to block 250. At block 250, the processor 110 may write the synonym in the first-ranked synonym slot 142 to the second-ranked synonym slot 144. At block 260, the second-ranked synonym slot 144 may be marked as valid, indicating the synonym in that position is valid. At block 270, the processor may write the newly active synonym to the first-ranked synonym slot 142. Thus, the newly active synonym may take the position of the most recently used synonym, while the previous most recently used synonym takes the position of the second most recently used synonym. The least recently used synonym that was stored in the synonym slots 140 prior to the method 200 may be overwritten and thus removed from the synonym slots 140 and from the cache directory.

Figure 3:
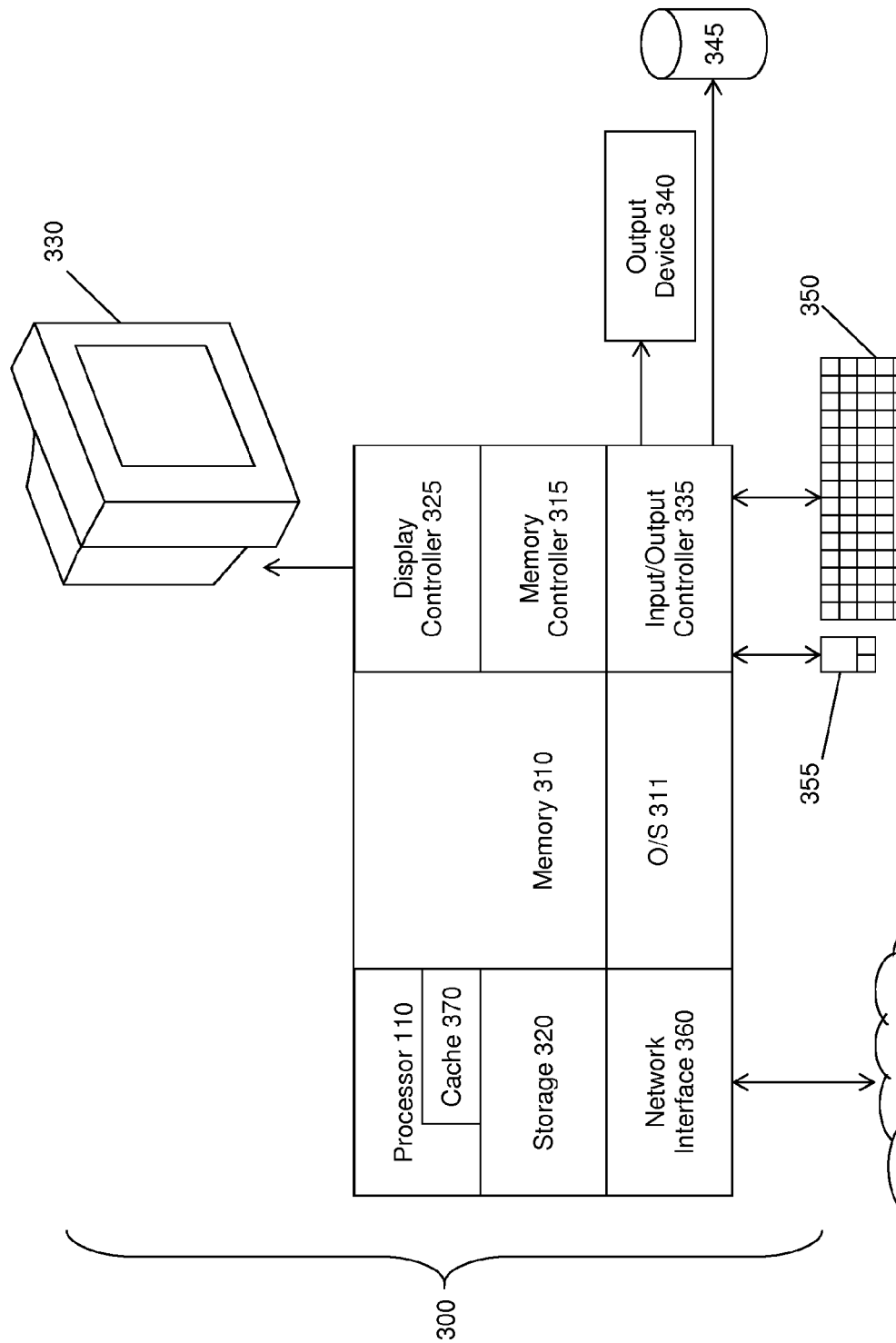
FIG. 3 is a block diagram of a computing device for implementing some or all aspects of the synonym management system, according to some embodiments of this disclosure.

FIG. 3 illustrates a block diagram of a computer system 300 for use in implementing a synonym management system or method according to some embodiments. The synonym management systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 110, physical memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 110 is a hardware device for executing hardware instructions or software, particularly those stored in the physical memory 310. The processor 110 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 110 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.). One of such cache levels may be the shared cache 130, which may maintain the synonym slots 140 in its cache directory as discussed above.

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 110.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 110 or other retrievable information, may be stored in storage 320, which may be a storage device such as a hard disk drive or solid state drive.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Synonym management systems and methods according to this disclosure may be embodied, in whole or in part, in computer program products or in computer systems 300, such as that illustrated in FIG. 3.

Technical effects and benefits of some embodiments include a least recently used replacement policy that need not require separate logic or circuits to keep track of which synonyms are the oldest. With a large cache, which can have over 256,000 entries, independent circuits for maintaining an LRU policy for synonym replacement would consume significant resources. Embodiments of this disclosure may avoid the consumption of such resources for this purpose.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a request to access a cache entry in a shared cache, the request referencing a synonym for the cache entry, a cache directory of the shared cache comprising, for each cache entry of the shared cache, a first-ranked synonym slot for storing a most recently used synonym for the cache entry and a second-ranked synonym slot for storing a second most recently used synonym for the cache entry; and
   based on receiving the request:
      writing contents of the first-ranked synonym slot for the cache entry to the second-ranked synonym slot for the cache entry; and
      writing the synonym referenced in the request to the first-ranked synonym slot for the cache entry.

2. The method of claim 1, wherein writing the contents of the first-ranked synonym slot for the cache entry to the second-ranked synonym slot for the cache entry demotes an other synonym from the second-ranked synonym slot for the cache entry.

3. The method of claim 2, wherein the cache directory comprises no more than two synonym slots for the cache entry, and wherein writing the contents of the first-ranked synonym slot for the cache entry to the second-ranked synonym slot for the cache entry demotes the other synonym from the cache directory.

4. The method of claim 1, wherein the cache directory comprises two or more synonym slots for each cache entry, and wherein a position of each synonym within the synonym slots is based on recent use relative to one or more other synonyms in the synonym slots.

5. The method of claim 4, wherein the cache directory is absent circuitry, other than the two or more synonym slots, for indicating which synonym was most recently used.

6. The method of claim 1, further comprising:
   receiving an other request for an other cache entry, wherein the other request references an other synonym;
   determining that the other synonym matches a synonym stored in the second-ranked synonym slot of the other cache entry; and
   swapping the synonyms in the first-ranked synonym slot and the second-ranked synonym slot of the other cache entry, responsive to determining that the other synonym matches the synonym stored in the second-ranked synonym slot of the other cache entry.

7. A system comprising:
   one or more computer processors configured to:
      receive a request to access a cache entry in a shared cache, the request referencing a synonym for the cache entry, a cache directory of the shared cache comprising, for each cache entry of the shared cache, a first-ranked synonym slot for storing a most recently used synonym for the cache entry and a second-ranked synonym slot for storing a second most recently used synonym for the cache entry; and
      based on receiving the request:
         write contents of the first-ranked synonym slot for the cache entry to the second-ranked synonym slot for the cache entry; and
         write the synonym referenced in the request to the first-ranked synonym slot for the cache entry.

8. The system of claim 7, wherein writing the contents of the first-ranked synonym slot for the cache entry to the second-ranked synonym slot for the cache entry demotes an other synonym from the second-ranked synonym slot for the cache entry.

9. The system of claim 8, wherein the cache directory comprises no more than two synonym slots for the cache entry, and wherein writing the contents of the first-ranked synonym slot for the cache entry to the second-ranked synonym slot for the cache entry demotes the other synonym from the cache directory.

10. The system of claim 7, wherein the cache directory comprises two or more synonym slots for each cache entry, and wherein a position of each synonym within the synonym slots is based on recent use relative to one or more other synonyms in the synonym slots.

11. The system of claim 10, wherein the cache directory is absent circuitry, other than the two or more synonym slots, for indicating which synonym was most recently used.

12. The system of claim 7, the one or more processors further configured to:
  receive an other request for an other cache entry, wherein the other request references an other synonym;
  determine that the other synonym matches a synonym stored in the second-ranked synonym slot of the other cache entry; and
  swap the synonyms in the first-ranked synonym slot and the second-ranked synonym slot of the other cache entry, responsive to determining that the other synonym matches the synonym stored in the second-ranked synonym slot of the other cache entry.

13. A computer program product for implementing a least recently used replacement policy for synonyms in a cache directory of a shared cache, the computer program product comprising a computer readable storage medium having program instructions embodied therewith, the program instructions executable by a processor to cause the processor to perform a method comprising:
  receiving a request to access a cache entry in a shared cache, the request referencing a synonym for the cache entry, a cache directory of the shared cache comprising, for each cache entry of the shared cache, a first-ranked synonym slot for storing a most recently used synonym for the cache entry and a second-ranked synonym slot for storing a second most recently used synonym for the cache entry; and
  based on receiving the request:
    writing contents of the first-ranked synonym slot for the cache entry to the second-ranked synonym slot for the cache entry; and
    writing the synonym referenced in the request to the first-ranked synonym slot for the cache entry.

14. The computer program product of claim 13, wherein writing the contents of the first-ranked synonym slot for the cache entry to the second-ranked synonym slot for the cache entry demotes an other synonym from the second-ranked synonym slot for the cache entry.

15. The computer program product of claim 14, wherein the cache directory comprises no more than two synonym slots for the cache entry, and wherein writing the contents of the first-ranked synonym slot for the cache entry to the second-ranked synonym slot for the cache entry demotes the other synonym from the cache directory.

16. The computer program product of claim 13, wherein the cache directory comprises two or more synonym slots for each cache entry, and wherein a position of each synonym within the synonym slots is based on recent use relative to one or more other synonyms in the synonym slots.

17. The computer program product of claim 16, wherein the cache directory is absent circuitry, other than the two or more synonym slots, for indicating which synonym was most recently used.

18. The computer program product of claim 13, the method further comprising:
  receiving an other request for an other cache entry, wherein the other request references an other synonym;
  determining that the other synonym matches a synonym stored in the second-ranked synonym slot of the other cache entry; and
  swapping the synonyms in the first-ranked synonym slot and the second-ranked synonym slot of the other cache entry, responsive to determining that the other synonym matches the synonym stored in the second-ranked synonym slot of the other cache entry.

* * * * *